United States Patent [19]
Gardner

[11] Patent Number: 6,124,661
[45] Date of Patent: Sep. 26, 2000

[54] GENERATOR WITH RETAINING RING KEY THAT REDUCES ROTOR TOOTH STRESS

[75] Inventor: William Cannon Gardner, Casselberry, Fla.

[73] Assignee: Siemens Westinghouse Power Corporation, Orlando, Fla.

[21] Appl. No.: 09/288,386

[22] Filed: Apr. 8, 1999

[51] Int. Cl.$^7$ .................................................. H02K 1/18
[52] U.S. Cl. ..................... 310/218; 310/270; 310/260; 310/267; 310/214; 310/216
[58] Field of Search .................................. 310/218, 270, 310/260, 267, 214, 216, 271

[56] References Cited

U.S. PATENT DOCUMENTS

| | | |
|---|---|---|
| 4,071,788 | 1/1978 | Martin et al. ............................... 310/42 |
| 4,316,114 | 2/1982 | Zagorodnava et al. . |
| 4,912,354 | 3/1990 | Frank ....................................... 310/271 |
| 4,967,465 | 11/1990 | Frank . |
| 5,068,564 | 11/1991 | Frank . |
| 5,174,011 | 12/1992 | Weigelt . |
| 5,528,097 | 6/1996 | Gardner et al. . |
| 5,861,698 | 1/1999 | Murphy . |
| 5,883,456 | 3/1999 | Gardner et al. .......................... 310/270 |

*Primary Examiner*—Nestor Ramirez
*Assistant Examiner*—Thanh Lam

[57] ABSTRACT

An electrical generator having a keyway for a retaining ring key formed in only the pole portion of the rotor and not in the tooth region of the rotor, and a method of repairing an electrical generator by forming such a keyway. The present invention lengthens the operating life of the rotor by eliminating a stress-concentrating discontinuity and by reducing the loads in the highly stressed tooth region of the rotor.

13 Claims, 3 Drawing Sheets

GENERATOR WITH RETAINING RING KEY THAT REDUCES ROTOR TOOTH STRESS

BACKGROUND OF THE INVENTION

This invention relates generally to electrical generators, and more specifically to the rotor portion of an electrical generator. This invention relates in particular to a generator rotor having an annular retaining ring that is restrained on an end of the rotor with a key and keyway formed in a pole region of the rotor. This invention also relates to a method of repairing a generator rotor having cracks in a tooth portion thereof.

DESCRIPTION OF THE PRIOR ART

Electrical generators installed in power plants are known to include a rotor and retaining ring assembly as illustrated in FIG. 1. A rotor assembly 10 includes a rotor 12, aligned for rotation about a longitudinal axis 14, and a retaining ring 16 that is installed over an end of the rotor 12. A tooth region 18 of the rotor 12 includes a plurality of longitudinal slots 20 formed therein defining a plurality of longitudinal teeth 22. A plurality of electrical field windings 24 is disposed within the plurality of slots 20. Wedges 26 are utilized to retain the field windings 24 tightly within the slots 20. The centrifugal force generated by the windings 24 during the operation of the electrical generator is opposed by the wedges 26, which in turn exert a load on teeth 22. End turns 28 of the windings 24 are restrained by the retaining ring 16. The inside diameter of retaining ring 16 is formed to be slightly smaller of the outside diameter of the rotor 12, thereby providing an interference fit between the two components. The retaining ring 16 is heated to expand its inside diameter in order to facilitate its installation on rotor 12. In addition to the shrink fit, the retaining ring 16 must be locked to the rotor shaft 12 with a positive longitudinal stop. This positive stop is formed by the interaction of key 29 with keyway groove 32 formed (seen more clearly in FIG. 2) in rotor 12 and groove 34 formed in retaining ring 16. Grooves 32 and 34 and key 29 extend around the entire circumference of shaft 12 and retaining ring 16.

FIG. 2 illustrates an expanded perspective view of a portion of the tooth region 18 of FIG. 1 with the retaining ring 16 and key 29 omitted from the drawing for clarification. As can be seen in FIG. 2, windings 24 are restrained by wedges 26 within the longitudinal slot 20 formed between adjacent teeth 22. A critical issue in the design of generator rotors is the possibility of the formation of cracks 30 in teeth 22. Such cracks 30 may result from low cycle fatigue caused by alternating loads due to the compression of the teeth 22 by the retaining ring 16 when the generator is idle and tension on the teeth 22 due to centrifugal force during operation of the generator. The keyway groove 32 amplifies the stress loading in the teeth 22 by two mechanisms. First, the width of the keyway 32 provides an area of windings 24 and wedges 26 that are unsupported. The adjacent tooth areas must carry the loads from this area. Secondly, the keyway 32 acts as a stress concentrator due to the creation of a discontinuity in the tooth 22. This area of a generator rotor shaft 10 is known to be highly stressed and cracks 30 have been known to form in teeth 22. To accommodate this weak area of the generator, the total number of starts and stops of the generator are limited in order to limit the effects of fatigue.

Methods for reconditioning rotor ends are known in the art, for example U.S. Pat. No. 5,528,097 issued on Jun. 18, 1996 to the inventor of the present invention, et al. It is also known in the art to utilize key ring designs that reduce the stress in the teeth, for example U.S. Pat. 5,861,698 issued on Jan. 19, 1999 to Murphy. These patents are incorporated by reference herein. However, further reductions in the level of stress in the teeth are desirable to provide an increased operating lifetime for the generator rotor.

In light of the limitations of the prior art generator rotor designs and repair methods, it is an object of this invention to provide an electrical generator having a rotor with reduced stress in the tooth region. It is a further object of this invention to provide a method of repairing or upgrading a rotor having a crack in its tooth region in order to provide extended operating life for the rotor.

SUMMARY OF THE INVENTION

These and other objects of this invention are realized in an electrical generator comprising a rotor having a longitudinal axis; a tooth region in the rotor, the tooth region having a plurality of longitudinal slots formed therein defining a plurality of longitudinal teeth; a pole region in the rotor adjacent the tooth region; an annular retaining ring having a circumferential groove formed therein and disposed around an end of the rotor; a groove formed in the pole region but not extending into the tooth region, the pole region groove being proximate the retaining ring circumferential groove; and a key disposed at least partially in the pole region groove and at least partially in the retaining ring circumferential groove. The objects of this invention are further realized in a method of repairing an electrical generator having a rotor, a tooth region having a plurality of longitudinal slots formed therein defining a plurality of teeth, and a pole region; a circumferential groove formed in the rotor through the tooth region and the pole region; at least one tooth having a crack formed therein proximate the rotor groove; an annular retaining ring having a circumferential groove formed therein and disposed around an end of the rotor; and a key partially disposed in the rotor groove and partially disposed in the retaining ring groove; the method comprising the steps of: removing the retaining ring and key from the rotor; removing at least a portion of the tooth containing the crack; forming a new groove in the pole region but not in the tooth region; providing a replacement retaining ring having a groove formed therein; providing a replacement key; and installing the replacement retaining ring and the replacement key onto the rotor end so that the replacement key is at least partially disposed in the pole region new groove and at least partially disposed in the replacement retaining ring groove.

DESCRIPTION OF PREFERRED EMBODIMENTS

Figure 1:
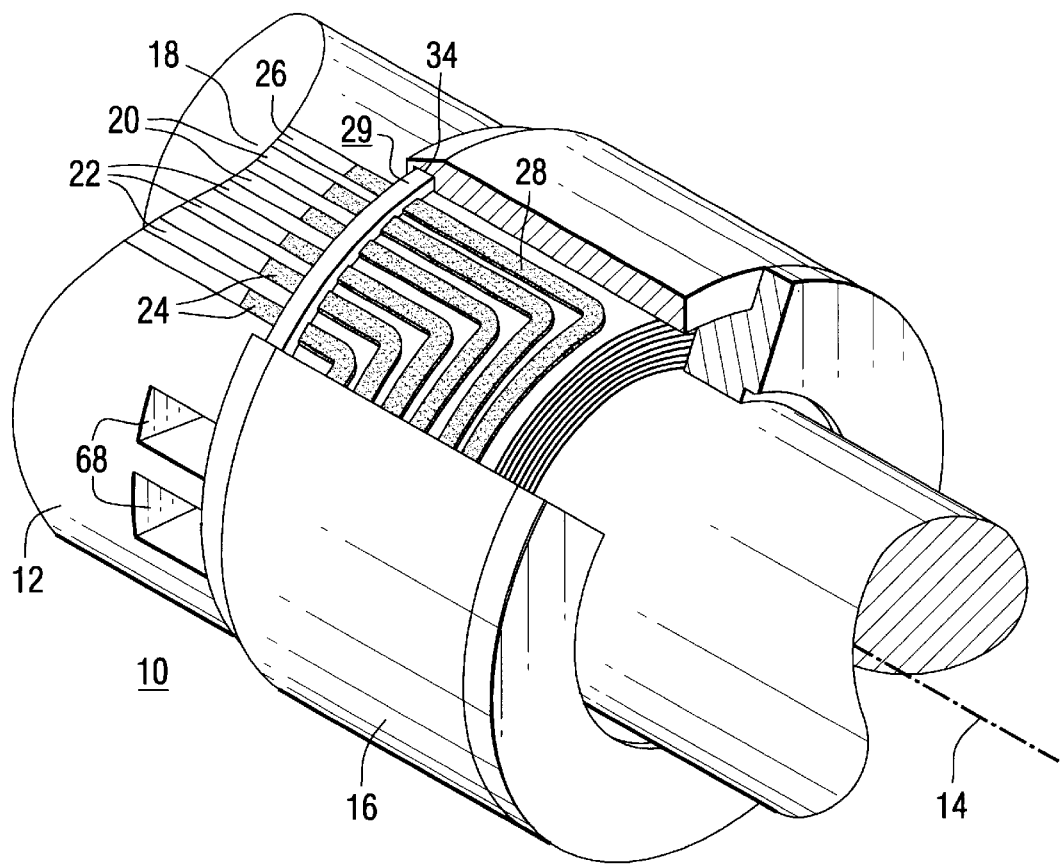
FIG. 1 is a perspective view of a generator rotor assembly as known in the prior art.
Figure 3:
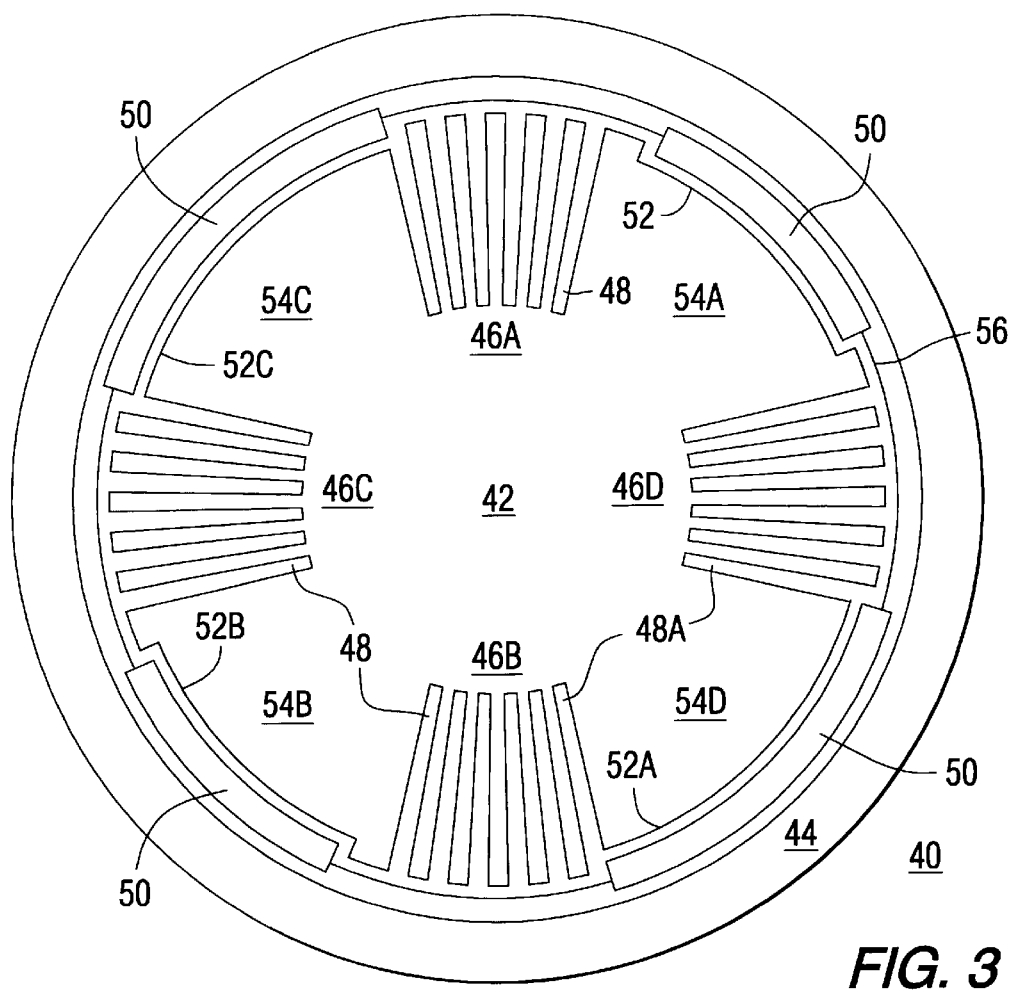
FIG. 3 is a cross-sectional view of a generator rotor assembly in accordance with the present invention.

FIG. 3 illustrates a cross-sectional view of a rotor assembly 40 of an electrical generator built in accordance with the present invention. The rotor assembly 40 includes a rotor 42 and an annular retaining ring 44 installed on an end of the rotor 42. For purposes of illustration, the rotor assembly 40 includes four tooth regions 46A, 46B, 46C, 46D as would be utilized in a four-pole generator, although the present invention is equally applicable to a two pole generator or other generator designs. As in the prior art, each pole region 46A–D is defined by a plurality of longitudinal slots 48 formed in the rotor 42. Windings (not shown) are disposed within the longitudinal slots 48. Retaining ring 44 is restrained from movement in the longitudinal direction in relation to rotor 42 by keys 50. A keyway groove or slot 52 is formed in a tangential direction in one or more of the pole regions 54A, 54B, 54C, 54D of the rotor 42. Key 50 is at least partially disposed in keyway 52 as well as at least partially disposed in a circumferential groove or keyway 56 formed in retaining ring 44. The circumferential groove 56 may be formed around the entire inner circumference of the retaining ring 44. By doing so, the retaining ring 44 can be utilized on rotors 12, 42 that are designed in accordance with either the prior art as shown in FIG. 1 or in accordance with the present invention as shown in FIG. 3.

Keyway groove 52 is shown as being formed to have its ends remote from the longitudinal slots 48. In this embodiment the circumferential rotation of key 50 is constrained by the configuration of keyway 52. An alternative embodiment is illustrated as keyway 52A having its ends extending to meet a first longitudinal slot 48A. In this embodiment key 50 is restrained from movement in the circumferential direction by the windings (not shown). Importantly the keyway groove 52, 52A does not extend into the tooth regions 46A, 46B, 46C, 46D. By eliminating the keyway groove of the prior art in the tooth regions, the present invention eliminates the stress increasing geometry of the prior art, thereby increasing the operating life of the shaft 42 significantly.

Figure 4:
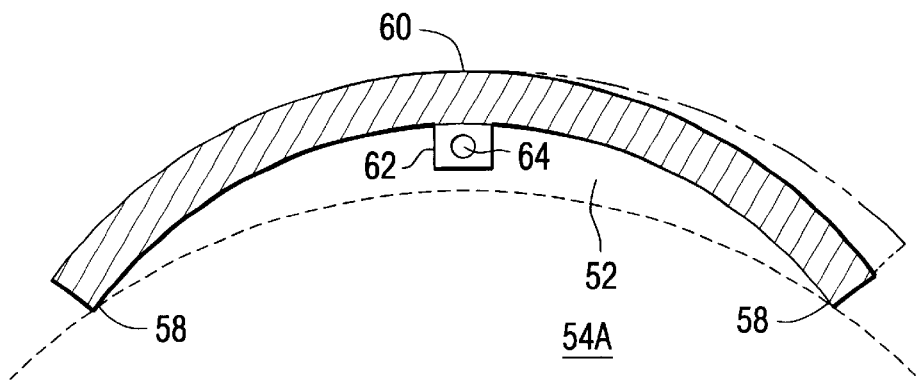
FIG. 4 is a cross-sectional view of a key and keyway of a rotor in accordance with the present invention.

FIG. 4 is a sectional end view of a portion of the rotor assembly 40 of FIG. 3 illustrating in greater detail the pole region 54A, the key 50, and the keyway 52. Retaining ring 44 is not shown in this illustration for purposes of clarity. FIG. 4 illustrates that key 50 is formed to have an inner diameter radius that is smaller than the inner surface radius of the groove 52. Key 50 is preferably formed from a spring steel material, as is known in the art, so that in its uncompressed state it rests in groove 52 on its ends 58 and extends above the top of groove 52 in its center portion 60. A lug 62 is attached to the key 50, preferably near its center portion 60. Lug 62 may be attached to key 50 by any known technique, such as by riveting, welding, or being integrally formed with key 50. Lug 62 may be formed having a hole 64 or other attachment mechanism for interacting with a tool 66 as can be seen of FIG. 5.

Figure 5:
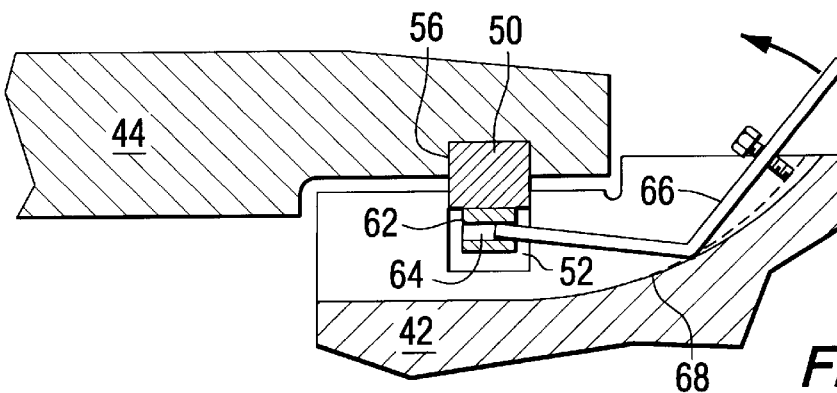
FIG. 5 is a sectional view of an assembly tool being used to assemble a generator rotor in accordance with this invention.

FIG. 5 illustrates a sectional view of an assembly tool 66 being used during the assembly or disassembly of a generator rotor. A key 50 is partially disposed in keyway 52 of rotor 12. Because the key 50 is formed with an inner diameter radius that is smaller than the inner surface radius of the keyway groove 52 it extends above the top of the keyway 52 in its relaxed state. Therefore, to install or to remove retaining ring 44 it is necessary to draw the key 50 fully into keyway 52. An access groove 68 is formed in shaft 42 to permit access to key 50 after retaining ring 44 is installed. The access groove 68 may preferably be a vent scoop as is known in the prior art and as is more clearly illustrated in FIG. 1. Assembly tool 66 is inserted into the access groove 68 and is connected to lug 62, preferably by being inserted into hole 64. Tool 66 may be a lever device operable to retract the key 50 fully into the keyway 52 by transferring a force that is applied to the end of the tool 66 extending outside the access groove 68. By inserting tool 66 into hole 64 it is possible to exert a pulling force on the lug 62 to pull the key 50 toward a bottom of the keyway 52. A bolt, spacer or other form of locking device may be provided on tool 66 so that the operator does not have to attend the tool 66 once the key 50 is in the withdrawn position. Once the retaining ring 44 is installed on the end of shaft 42, the tool 66 may be removed, and the spring force within key 50 will retain it at least partially within circumfrential groove 56. Centrifugal force acting on key 50 during operation of the generator will deflect the ends 58 of key 50 outwardly into the circumfrential groove 56, thereby assuring a full sheer area of the key 50 is available between shaft 42 and retaining ring 44.

Figure 2:
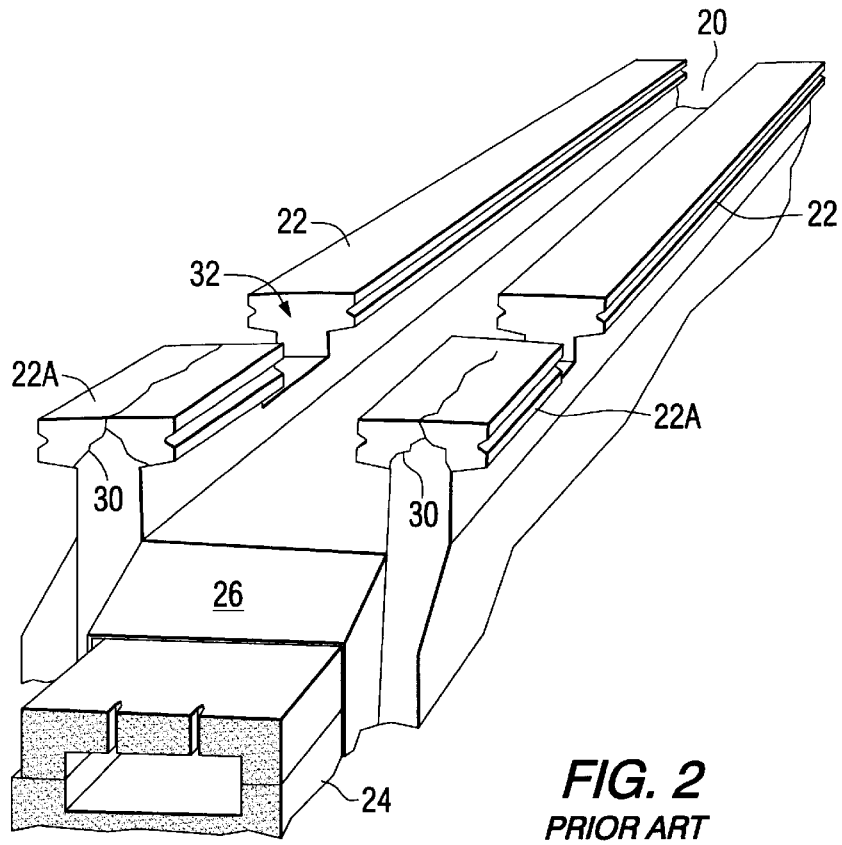
FIG. 2 is a perspective view of the tooth region of a generator rotor as is known in the prior art illustrating cracks in the teeth of the rotor.

An electrical generator can be repaired or upgraded to include the rotor shaft and keyway design of the present invention. In particular a rotor shaft 12 of the prior art having a crack 30 in a tooth 22 can be modified to incorporate the present invention, thereby extending the operating life of the rotor shaft 12. To incorporate this invention into an operating electrical generator, the annular retaining ring 16 and key 30 of the prior art must first be removed from the rotor shaft 12. Those portions of the teeth containing cracks can be removed by standard machining process. As shown in FIG. 2 the entire end portion 22A of a cracked tooth 22 may be machined away. A new groove 52 is then formed in the pole region 54A, but not in the tooth region 46A, as illustrated in FIG. 3. A plurality of new grooves 52, 52A, 52B, 52C, may be formed in the respective pole regions. A replacement annular retaining ring 44 is provided having a circumfrential groove 56 formed therein. The replacement annular retaining ring 44 may be the original retaining ring 16 with any required change in groove location or may be a new retaining ring. One or more replacement keys 50 are provided as required, and are installed into the grooves 52, 52A, 52B, 52C, as appropriate in the rotor shaft 42. As described above the replacement key 50 will have an inner diameter radius that is smaller than the inner surface radius of the groove 52, so that the replacement key 50 protrudes above a top of groove 52 in a relaxed state. In order to install the annular retaining ring 44 onto the end of rotor shaft 42, it is necessary to pull the replacement key toward the bottom of keyway groove 52 while installing the retaining ring 44. As described above a tool 66 may be inserted through vent scoop 68 to interact with a lug 62 in order to exert a pulling force on the lug to draw the key 50 toward a bottom of keyway 52 during the installation of the retaining ring 44. Once the retaining ring 44 is installed, the tool 66 is withdrawn and the key 50 springs to a position at least partially disposed in the retaining ring groove 56 and partially disposed in the pole region groove 52.

It should be noted that while the subject invention provides a reduced level of stress in the tooth region 46A, 46B, 46C, 46D, it does provide an increase in stress in the pole region 54A, 54B, 54C, 54D. A complete stress analysis is required to ensure that these increased loads in the pole regions are acceptable. The inventor has found that by reducing the stresses in the most critical tooth region, that the overall expected life of a rotor in accordance with the present invention is improved when compared to that of a prior art design.

The above embodiments are provided for the purposes of illustration and not limitation, and the scope of the invention should be construed in accordance with the claims as follows.

I claim as my invention:

1. An electrical generator comprising:

a rotor having a longitudinal axis;

a tooth region in the rotor, the tooth region having a plurality of longitudinal slots formed therein defining a plurality of longitudinal teeth;

a pole region in the rotor adjacent the tooth region;

an annular retaining ring having a retaining ring groove formed therein and disposed around an end of the rotor;

a pole region groove formed in the pole region but not extending into the tooth region, the pole region groove being disposed proximate the retaining ring groove; and a key disposed at least partially in the pole region groove and at least partially in the retaining ring groove.

2. The generator of claim 1, wherein the key is formed to have an inner diameter radius smaller than an inner surface radius of the pole region groove.

3. The generator of claim 1, further comprising a lug attached to the key, the lug formed to interact with a tool for retracting the key fully into the pole region groove.

4. The generator of claim 1, further comprising a lug attached to the key; and a scoop formed in the pole region proximate the lug, the scoop providing access to the lug for retracting the key fully into the pole region groove.

5. The generator of claim 4, wherein the circumferential rotation of the key is constrained by the configuration of the lug and the scoop.

6. The generator of claim 1, wherein the tooth region, pole region, key and pole region groove comprise a first tooth region, a first pole region, a first key and a first pole region groove respectively, and further comprising:

a second tooth region and a second pole region formed in the rotor;

a second pole region groove formed in the second pole region but not extending into the first or the second tooth region; and a second key disposed at least partially in the second pole region groove and at least partially in the retaining ring groove.

7. The generator of claim 1, wherein the pole region groove has an end extending to a first of the longitudinal slots but not to a first of the teeth.

8. The generator of claim 1, wherein the pole region groove has an end remote from the longitudinal slots.

9. The generator of claim 1, further comprising:

a plurality of field windings disposed within the plurality of slots, the field windings forming end turns proximate the rotor end; and the retaining ring being disposed around the rotor end and end turns.

10. A rotor for an electrical generator comprising;

a pole region;

a tooth region adjacent the pole region, the tooth region having a plurality of longitudinal slots formed therein defining a plurality of longitudinal teeth; and a keyway formed in the pole region but not in the tooth region for resisting a force imposed on the rotor by an annular retaining ring.

11. The rotor of claim 10, wherein the tooth region, pole region, and pole region keyway comprise a first tooth region, a first pole region, and a first pole region keyway respectively, and further comprising:

a second tooth region and a second pole region; and a second tangential keyway formed in the second pole region but not extending into the first or the second tooth region for resisting a force imposed on the rotor by an annular retaining ring.

12. The rotor of claim 10, wherein the pole region keyway has an end extending to a first of the longitudinal slots but not to a first of the teeth.

13. The rotor of claim 10, wherein the pole region keyway has an end remote from the longitudinal slots.

* * * * *